United States Patent [19]

Matsui et al.

[11] Patent Number: 5,436,032
[45] Date of Patent: Jul. 25, 1995

[54] METHOD FOR TREATING LINER MATERIAL FOR MAGNETIC RECORDING MEDIUM

[75] Inventors: Tadashi Matsui; Yuzo Matsuo; Hideo Kobayashi; Hiroshi Ikeda; Shigemi Wakabayashi, all of Tochigi, Japan

[73] Assignee: Kao Corporation, Tokyo, Japan

[21] Appl. No.: 172,147

[22] Filed: Dec. 23, 1993

[30] Foreign Application Priority Data

Dec. 25, 1992 [JP] Japan .................................. 4-347295

[51] Int. Cl.⁶ .............................................. B05D 3/12
[52] U.S. Cl. .................................. 427/365; 427/128; 427/372.2; 427/387
[58] Field of Search ............................... 427/127–132, 427/387, 372.2, 365; 428/64–66

Primary Examiner—Bernard Pianalto
Attorney, Agent, or Firm—Birch Stewart Kolasch & Birch

[57] ABSTRACT

A treating method of a liner material for a magnetic recording medium according to the present invention is a treating method of a liner material which is to be bonded to the inside of a case storing therein a magnetic disk, and is characterized in that at least 0.1 wt %, based on the saturated water content of the liner material, of a liquid having a boiling point of 50° to 200° C. is added to the liner material, and is then dried.

A treating apparatus of a liner material for a magnetic recording medium according to the present invention is an apparatus for executing the treating method described above, and comprises a feeder for feeding a belt-like liner material, a wetting device for allowing the liner material fed out from the feeder to contain a liquid, a dryer for drying the liner material containing the liquid, and a winder for taking up the dried liner material, wherein the liner material delivered from the winder passes through the wetting device and the dryer and is taken up by the winder.

8 Claims, 2 Drawing Sheets

METHOD FOR TREATING LINER MATERIAL FOR MAGNETIC RECORDING MEDIUM

BACKGROUND OF THE INVENTION

1. Field of the Invention

This invention relates to a method and apparatus for treating a liner material for a magnetic recording medium. More particularly, the present invention relates to a method of treating a liner material for a magnetic recording medium which improves the cleaning effect of a liner material to a magnetic disk, and a treating apparatus for executing the method.

2. Description of the Prior Art

A liner is generally disposed inside a case for storing a magnetic disk in order to remove dust, which might result in read and write errors in a magnetic recording medium, from the surface of the magnetic disk, and when the liner comes into contact with the surface of the magnetic disk rotating inside the case, dust adhering to the surface of the magnetic disk can be removed. A non-woven fabric is generally used as a material for forming the liner.

In a conventional magnetic recording medium, however, the cleaning effect of the magnetic disk by the liner is not sufficient, and the cleaning effect is likely to drop with time. Accordingly, materials and shape of the liner and its bonding pattern (which is also called "laminate pattern") when the liner is bonded to the inner surface of the case, have been examined in the past, but none of them have yet been entirely satisfactory.

SUMMARY OF THE INVENTION

It is therefore an object of the present invention to provide a method and apparatus for treating a liner material for a magnetic recording medium capable of providing a liner material which has a high cleaning effect on a magnetic disk, and the cleaning effect of which hardly drops with time.

As a result of intensive studies, the inventors of the present invention have clarified that the drop of the cleaning effect by the liner of the magnetic disk with time results from the decrease of the thickness of the liner with time due to pressure caused by deformation of the case at the time of handling of the magnetic recording medium, and due to the load by a hand of people and pressure from a driving device, because the liner has a low cushion property.

Accordingly, the present inventors have further studied so as to impart cushioning properties to a liner and have found out that suitable cushioning properties can be imparted to a liner and a decrease in the cleaning effect of a liner of a magnetic disk with time can be prevented by first allowing the liner to contain water, then drying the water-containing liner and bonding it to the inside of the case. In this way, the cleaning effect can be improved or in other words, the object of the invention described above can be accomplished.

The present invention is completed on the basis of the results described above. In other words, the present invention provides a method of treating a liner material to be bonded to the inside of a case storing therein a magnetic disk, which comprises the steps of adding at least 0.1 wt %, based on the saturated water content of the liner material, of a liquid having a boiling point of 50° to 200° C. to the liner material, and then drying the liner material.

As an apparatus suitable for executing the treating method of the invention described above, the present invention provides an apparatus for treating a liner material for a material recording medium, which comprises a feeder for feeding a belt-like liner material, a wetting device for allowing the liner material fed from the feeder to contain a liquid, a dryer for drying the liquid-containing liner material, and a winder on which the dried liner material is wound, and in which the liner material fed from the feeder is passed through the wetting device and the dryer and is then wound on the winder.

By the treating method and the treating apparatus of the present invention, it is possible to obtain a liner material which has a high cleaning effect to the magnetic disk and keeps the cleaning effect of the initial stage (or little drop of the cleaning effect with time).

DETAILED DESCRIPTION OF THE PREFERRED EMBODIMENTS

Figure 1:
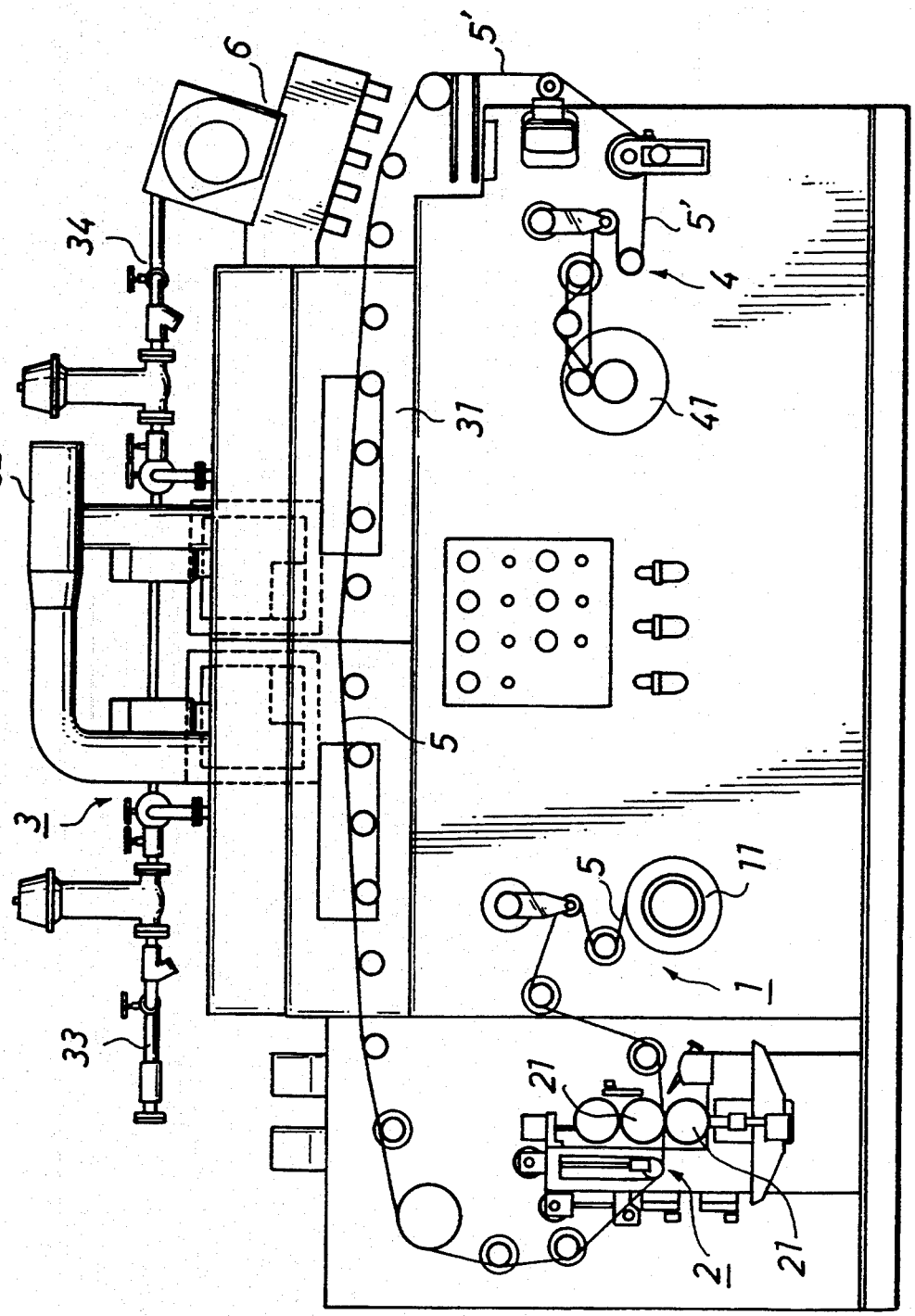
FIG. 1 is a side view showing the outline of a treating apparatus of an embodiment according to the present invention.

To begin with, a method of treating a liner material for a magnetic recording medium according to the present invention will be described in detail.

Incidentally, the term "liner material" herein used means a material which can be used as a liner for a magnetic recording medium by punching it into a predetermined shape.

To practice the treating method of the present invention, the liner material is first impregnated with a liquid having a boiling point of 50° to 200° C.

The method of allowing the liner material to contain the liquid is not particularly limited, and it is possible to employ a method of dipping the liner material into a liquid, a method of coating the liner material with a liquid using a coater, and so forth.

The amount of the liquid to be contained in the liner material is at least 0.1 wt %, based on the saturated water content of the liner material, preferably from 0.1 to 80 wt % and more preferably, from 0.1 to 10 wt %. This amount is selected appropriately in accordance with the properties of the liner material. If the amount of the liner material contained is less than 0.1 wt %, based on the saturated water content, the objective cushioning properties cannot be obtained.

It is preferable to apply a pressure to the liner material before the liner material containing the liquid is dried. The method of applying a pressure is not particularly limited, but when gravure rollers are employed, cushioning properties can be further improved. When the gravure rollers are used, the liquid described above is supplied into grooves made in the surface of the gravure rollers. Accordingly, impregnation with a liquid and pressurization of the liner material can be effected simultaneously. The degree of pressurization may be a little and is generally from 0.1 to 8 kg/cm (linear pressure). If the pressurization exceeds this range, the fibers constituting the liner material would be damaged. The pressurization time is not particularly limited, and is sufficiently up to one second from the aspect of promotion of permeation of water.

After the liquid is contained in the liner material in such manner, the liner material is then dried.

Drying is preferably carried out by heating. The heating temperature in this case is a temperature below the lower ignition point of those of the liner material and the liquid, and is preferably from 50° to 150° C. When the heating temperature is less than 50° C., evaporation of the liquid is retarded depending on the kind of liquid and the cushioning properties is likely to lower. When the temperature is higher than 150° C., on the other hand, the constituent fibers of the liner material will be damaged due to the heat. When a liquid having a low boiling point is contained in the liner material, drying may be carried out by leaving the liner material standing at normal temperature and in such a case, the atmosphere is desirably of a temperature higher than 20° C.

The liner material is dried in one to several seconds by heating at the temperature described above. As another drying means, the liner material (moving the liner material) is passed through a heating furnace heated to the temperature described above.

The "liquid having a boiling point of 50° to 200° C." used in the treating method of the present invention includes, besides water, hydrocarbons such as heptane, methylcyclohexane, octane, α-pinene, decalin, toluene, xylene, cumene, p-cymene, petroleum benzene, hexane, cyclohexane, etc; halogenated hydrocarbons such as 1,2-dichloroethane, trichloroethylene., tetrachloroethylene, 1,2-dibromoethane, 1,1,2,2-tetrachloroethane, chlorobenzene, bromobenzene, o-dichlorobenzene, carbon tetrachloride, chloroform, etc; ethers such as tetrahydrofuran, dipropyl ether, dioxane, diisobutyl ether, dibutyl ether, anisole, diisopentyl ether, phenetol, petroleum ether, diisopropyl ether, etc; ether alcohols such as 2-methoxyethanol, 2-ethoxyethanol, etc; esters such as ethyl formate, methyl acetate, isopropyl acetate, isobutyl acetate, isopentyl acetate, methyl benzoate, ethyl acetate, etc; ketones such as methyl ethyl ketone, cyclohexanone, acetone, etc; and alcohols such as isopropyl alcohol, allyl alcohol, 1-propanol, isobutyl alcohol, 1-butanol, isopentyl alcohol, cyclohexanol, 1,2-propanediol, 1,2-ethanediol, ethanol, methanol, etc. Among them, preferable are water, isopropyl alcohol and hexane.

When a liquid having a boiling point of less than 50° C. is used as the liquid, the stability (concentration, etc) of the liquid itself gets deteriorated, and when a liquid having a boiling point higher than 200° C. is used, on the other hand, drying efficiency drops.

A silicon compound is preferably contained in the liquid described above. Examples of such a silicon compound includes chain polydimethylsiloxane or modified chain polydimethylsiloxanes into which a hydroxyl group, an amino group, a mercapto group, a carboxyl group, an α-methylstyrene group, an α-olefin group, fluorine, an alkyl group, a higher fatty acid group, a methacryloyl group, an acryloyl group, a polyether group or an epoxy group is introduced. This silicon compound is added preferably in such an amount that it is contained in an amount of 0.01 to 50 g per kilogram of the liner material after drying. Generally, 0.5 to 250 g of the silicon compound is preferably contained in 1 kg of the liquid.

Pasteurization/antimolding effects can be imparted to the liner material by adding a silicone type quaternary ammonium salt compound to the liquid so as to allow the liner material to contain the silicon compound.

Any silicone type quaternary ammonium salt compound can be used without any limitation so long as they have pasteurization/antimolding effects, but the compounds expressed by the following formula (I) are preferable:

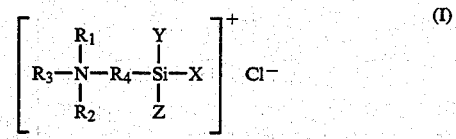

where one or two of $R_1$, $R_2$ and $R_3$ are methyl groups with the rest being a $C_8$ to $C_{30}$ alkyl group, $R_4$ is an alkylene chain, and preferably, a $C_1$ to $C_5$ alkylene chain, and at least one of X, Y and Z is an alkoxy group with the rest being alkyl groups.

In the formula (I) given above, preferable are those which are expressed by the following structural formulas (II) and (III):

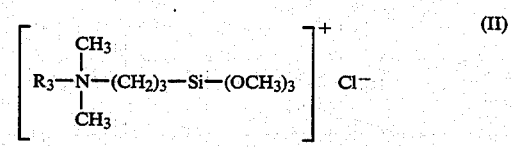

where R is an alkyl group, preferably a $C_8$ to $C_{30}$ alkyl group and particularly preferably $C_{18}H_{37}$.

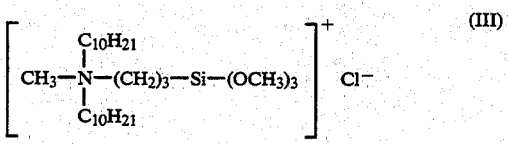

Desirably, 0.0001 to 10 wt % of the silicone type quaternary ammonium salt compound on the basis of the dry weight of the liner material is contained.

The liner material treated by the treating method of the present invention is a conventional liner material used for a magnetic recording medium, and the materials for forming this liner material are generally a non-woven fabric of plastic fiber having a thickness (diameter) of 7 to 20 μm, such as polyester, polypropylene, rayon, nylon, acryl, and so forth. Such a non-woven fabric may comprise only one kind of fiber or a mixture of two or more kinds of fibers such as 50% polyester fibers/50% rayon fibers, 20% nylon fibers/80% rayon fibers, and 25% polypropylene fibers/75% rayon fibers.

A treating apparatus suitable for practising the treating method of the present invention described above will be explained on the basis of an embodiment shown in FIGS. 1 to 3.

As shown in FIG. 1, this treating apparatus comprises a feeder 1 for feeding a belt-like liner material 5, a wetting device 2 for allowing the liner material 5 fed from the feeder 1 to contain the liquid, a dryer 3 for drying the liner material 5 containing the liquid, and a winder 4 for winding up the dried liner material 5.

The feeder 1 and the winder 4 are interlocked with a driving source (not shown) and are so arranged as to send an untreated liner material 5 supplied to the feeder 1 from the feeder 1, and to wind up the treated liner material 5' as a roll 41 by the winder 4 through the wetting device 2 and the dryer 3.

The wetting device 2 is so constituted as to allow the liner material 5 to contain the liquid by passing the liner material 5 between a pair of coating rolls (gravure rolls) 21 and 21. The liquid is supplied in this instance by a feed nozzle disposed at a lower part of the gravure rolls, and wetting of the liquid is effected as the liquid on the gravure rolls is transferred to the liner material 5 simultaneously when a predetermined pressure is applied between the rolls 21 and 21.

The dryer 3 has a construction such that when the liner material 5 containing the liquid is passed through a heating furnace 31 capable of adjusting the temperature at a predetermined atmosphere temperature (heating temperature), the liner material 5 is dried. Reference numeral 32 denotes an exhaust duct and reference numerals 33 and 34 denote heating vapor feed pipes. A cooling fan 6 for cooling the dried liner material 5' is disposed at the outlet of the heating furnace 31.

Incidentally, tension regulators, guide rollers, etc, are provided to the feeder 1 and the winder 4 in the apparatus of this embodiment so as to smoothly conduct feed and take-up of the liner material 5 (5'), as shown in the drawings. However, this construction is the same as those of conventional apparatuses of this kind, and the wetting device 2 as well as the dryer 3 have the same construction as those of conventional coaters arid heaters. Accordingly, the explanation of these devices in detail will be omitted.

The treating apparatus of the present invention is not particularly limited to the embodiment given above. For example, it is possible to use a reverse roll coater, a gravure coater, a knife coater, a blade coater, a rod coater, an air doctor coater, a curtain flow coater, a fountain coater, a kiss coater, and other ordinary coaters in general can be used as the wetting device. When the reverse roll coater or the gravure coater is used, impregnation with the liquid and pressurization of the liner material can be simultaneously effected.

Figure 2:
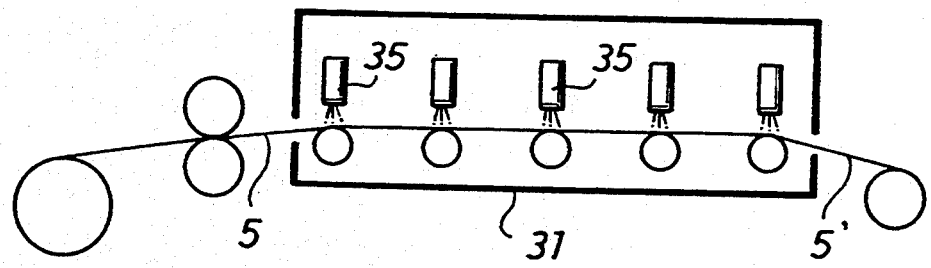
FIG. 2 is a side view showing the outline of the treating apparatus using a hot air blow-out portion as a dryer according to the present invention.
Figure 3:
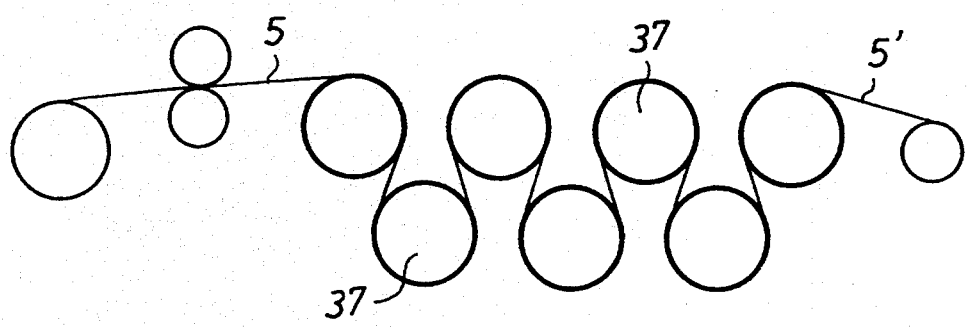
FIG. 3 is a side view showing the outline of the treating apparatus of the present invention, using heating rollers as a dryer.

The dryer may have a construction, as shown in FIG. 2, wherein a plurality of hot air blow-out portions 35 are disposed inside the heating furnace 31, and the liner material 5 containing the liquid is dried while it passes below the hot air blow-out portions 35. Alternatively, it may have a construction, as shown in FIG. 3, wherein the liner material 5 is dried while it passes on a plurality of heating rolls 37.

The liner material treated by the present invention is punched into a predetermined shape, and is bonded to the inside of a case for accommodating a magnetic disk.

According to the present invention, suitable cushioning properties can be imparted to the liner material. Therefore, the magnetic recording medium produced using the liner formed of the liner material treated by the present invention can retain a cleaning effect at the initial stage even when the liner undergoes compression by an external pressure, because the thickness of the liner restores as soon as the pressure is removed.

The present invention will be explained in further detail with reference to Examples exhibiting the effects of the present invention in comparison with Comparative Examples.

EXAMPLE 1

A liner material (non-woven fabric) was treated in the following way by the use of the treating apparatus of the present invention shown in FIG. 1.

A non-woven fabric (thickness: 332 μm) comprising 80 wt % of rayon fibers and 20 wt % of nylon fibers was allowed to contain water, and a pressure (0.1 kg/cm, linear pressure) was applied to the non-woven fabric by a wetting device. There was thus obtained a water-containing treated non-woven fabric (moisture content: 0.1% of saturated moisture content).

Next, this water-containing treated non-woven fabric was kept for about 2 seconds inside a dryer at 120° to 150° C. and was dried to provide a processed non-woven fabric (thickness: 358 μm).

Thereafter, a part of this processed non-woven fabric was punched out into a predetermined shape to obtain a liner, and this liner was bonded by ultrasonic fusion to the inside of a case. A magnetic disk was accommodated in this case to obtain a magnetic recording medium (disk cartridge). Incidentally, the thickness of the non-woven fabric was the one at the time of pressurization of 5 gf/cm$^2$.

Cleaning performance of the liner of this magnetic recording medium was examined in the following way.

Cleaning by the liner was effected by dropping $n_o$ pieces of liner dusts (50 to 100 μm) on the surface of the magnetic disk of this magnetic recording medium and then making one turn of the magnetic disk. The number n of residual liner dusts on the surface of the magnetic disk was counted through a microscope, and cleaning performance (%) was determined in accordance with the following equation.

The cleaning performance of the liner of the magnetic recording medium was found to be 99.9%:

$$\text{cleaning performance (\%)} = \frac{n_0 - n}{n_0} \times 100$$

While a load of 10 g/cm$^2$ was applied to the entire part of the magnetic recording medium, the medium was left standing for 48 hours. Thereafter, the load was removed and the cleaning performance was examined. The cleaning performance in this case was found to be 99.4%.

EXAMPLE 2

A processed non-woven fabric (thickness: 360 μm) was obtained in the same way as in Example 1 except that the moisture content of the water-containing treated non-woven fabric was changed to 1% of the saturated water content. A magnetic recording medium (disk cartridge) was obtained using this processed non-woven fabric in the same way as in Example 1.

The cleaning performance of the liner of this magnetic recording medium was found to be 99.9%.

While a load of 10 g/cm$^2$ was applied to the entire part of the magnetic recording medium, the medium was left standing for 48 hours. Thereafter, the load was removed and the cleaning performance was examined. Cleaning performance was found to be 99.4%.

EXAMPLE 3

A processed non-woven fabric (thickness: 362 μm) was obtained in the same way as in Example 1 except that the moisture content of the water-containing treated non-woven fabric was changed to 10% of the saturated water content. A magnetic recording medium (disk cartridge) was obtained using this processed non-woven fabric in the same way as in Example 1.

The cleaning performance of the liner of this magnetic recording medium was found to be 99.9%.

While a load of 10 g/cm² was applied to the entire part of this magnetic recording medium, the medium was left standing for 48 hours. Thereafter, the load was removed and the cleaning performance was examined. The cleaning performance was found to be 99.4%.

COMPARATIVE EXAMPLE 1

A magnetic recording medium (disk cartridge) was obtained in the same way as in Example 2 except that an untreated non-woven fabric was used in place of the processed non-woven fabric.

The cleaning performance of the liner of this magnetic recording medium was found to be 93.8%.

While a load of 10 g/cm² was applied to the entire part of the magnetic recording medium, the medium was left standing for 48 hours. Thereafter, the load was removed and the cleaning performance was examined. The cleaning performance was found to be 88.1%.

EXAMPLE 4

A processed non-woven fabric (thickness: 366 μm) was obtained in the same way as in Example 1 except that 10% of isopropyl alcohol was contained in place of water. A magnetic recording medium (disk cartridge) was obtained using this processed non-woven fabric in the same way as in Example 1.

The cleaning performance of the liner of this magnetic recording medium was found to be 99.9%.

While a load of 10 g/cm² was applied to the entire part of the magnetic recording medium, the medium was left standing for 48 hours. Thereafter, the load was removed and the cleaning performance was examined. The cleaning performance was found to be 99.6%.

EXAMPLE 5

A processed non-woven fabric (thickness: 360 μm) was obtained in the same way as in Example 1 except that 10% of a mixture of water and a silicone compound (polyether-modified polydimethylsiloxane: content of silicone compound=1 wt %) was used in place of water. A magnetic recording medium (disk cartridge) was obtained in the same way as in Example 1 using this processed non-woven fabric.

The cleaning performance of the liner of this magnetic recording medium was found to be 99.9%.

While a load of 10 g/cm² was applied to the entire part of the magnetic recording medium, the medium was left standing for 48 hours. Thereafter, the load was removed and the cleaning performance was examined. The cleaning performance in this instance was found to be 99.9%.

Table 1 shows the test results of the cleaning performances of Examples 1 to 5 and Comparative Example 1.

TABLE 1

| Example | water content (%) | liner thickness (μm) | cleaning performance before load application | cleaning performance after load application |
|---|---|---|---|---|
| 1 water treatment | 0.1 | 358 | 99.9 | 99.4 |
| 2 water treatment | 1 | 360 | 99.9 | 99.4 |
| 3 water treatment | 10 | 362 | 99.9 | 99.4 |
| 4 IPA treatment | 10 | 366 | 99.9 | 99.6 |
| 5 water + Si treatment | 10 | 360 | 99.9 | 99.9 |
| Comp. Example 1 untreated | — | 332 | 93.8 | 88.1 |

What is claimed is:

1. A method for treating a liner material for a magnetic recording medium to be bonded to the inside of a case storing therein a magnetic disk, which comprise adding at least 0.1% by weight, based on the saturated water content of said liner material, of a liquid having a boiling point of 50° to 200° C. to said liner material, and then drying.

2. The method for treating a liner material for a magnetic recording medium according to claim 1, wherein said liquid is water.

3. The method for treating a liner material for a magnetic recording medium according to claim 1, wherein said liquid contains a silicone compound.

4. The method for treating a liner material for a magnetic recording medium according to claim 1, wherein said liner material further contains a silicone type quaternary ammonium salt compound.

5. The method for treating a liner material for a magnetic recording medium according to claim 1, wherein a pressure is applied to said liner material before said liner material containing said liquid is dried.

6. The method for treating a liner material for a magnetic recording medium according to claim 1, wherein drying is considered at a temperature of not lower than 20° C.

7. The method for treating a liner material for a magnetic recording medium according to claim 1, wherein said liner material containing said liquid is dried by heating.

8. The method for treating a liner material for a magnetic recording medium according to claim 7, wherein the heating temperature is from 100° to 150° C.

* * * * *